US012395081B2

(12) United States Patent
Thota et al.

(10) Patent No.: US 12,395,081 B2
(45) Date of Patent: Aug. 19, 2025

(54) SYSTEM AND METHOD FOR ADDING PHASE TO IMPROVE LOAD TRANSIENT PERFORMANCE OF MULTI-PHASE CONVERTER

(71) Applicant: SAMSUNG ELECTRONICS CO., LTD., Suwon-si (KR)

(72) Inventors: Prudhvi Raj Thota, Bengaluru (IN); Anjali Venugopal, Bengaluru (IN); Shyam Prasad Venkata Voleti, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 270 days.

(21) Appl. No.: 18/204,674

(22) Filed: Jun. 1, 2023

(65) Prior Publication Data
US 2024/0339916 A1 Oct. 10, 2024

(30) Foreign Application Priority Data
Apr. 4, 2023 (IN) .............................. 202341025583

(51) Int. Cl.
H02M 1/00 (2007.01)
H02M 3/158 (2006.01)

(52) U.S. Cl.
CPC ....... H02M 3/1584 (2013.01); H02M 1/0029 (2021.05); H02M 3/1586 (2021.05)

(58) Field of Classification Search
CPC . H02M 1/0029; H02M 3/1584; H02M 3/1586
See application file for complete search history.

(56) References Cited

U.S. PATENT DOCUMENTS 6,912,144 B1 * 6/2005 Clavette .............. H02M 3/1584
323/283
7,279,933 B2 10/2007 Lee
(Continued)

OTHER PUBLICATIONS

Youngkook Ahn et al., "A Multiphase Buck Converter With a Rotating Phase-Shedding Scheme for Efficient Light-Load Control", IEEE Journal of Solid-State Circuits, vol. 49, No. 11, Nov. 2014, 11 pages total.

Primary Examiner — Jue Zhang
(74) Attorney, Agent, or Firm — Sughrue Mion, PLLC

(57) ABSTRACT

A circuit for slew rate detection and phase control in a multi-phase converter is provided. The circuit includes a first comparator configured to trigger when an output voltage of the multi-phase converter falls to a first output voltage level threshold value. The circuit further includes a second comparator configured to trigger when the output voltage falls to a second output voltage level threshold value which is lower than the first output voltage level threshold value. The circuit further includes a timer configured to start to run for a predefined time window, when the output voltage of the multi-phase converter falls below first output voltage level threshold value. The circuit further includes phase control logic configured to distinguish the ramp rate of the output voltage of the multi-phase converter as corresponding to a slow-rate ramp, a mid-rate ramp or a fast-rate ramp based on the outputs of the first comparator, the second comparator and the timer and enable phases synchronously or asynchronously based on the distinguishing of the ramp rate of the output voltage of the multi-phase converter as corresponding to the mid-rate ramp or the fast-rate ramp.

16 Claims, 10 Drawing Sheets

(56) References Cited

U.S. PATENT DOCUMENTS

| | | |
|---|---|---|
| 8,710,810 B1 * | 4/2014 | McJimsey ............ H02M 3/158 |
| | | 323/283 |
| 9,584,018 B2 | 2/2017 | Kelin et al. |
| 10,673,328 B2 | 6/2020 | Bari et al. |
| 2011/0062929 A1 | 3/2011 | Strydom et al. |
| 2011/0221408 A1 | 9/2011 | Martin et al. |
| 2018/0013348 A1 | 1/2018 | Paul et al. |
| 2018/0175734 A1 | 6/2018 | Gherghescu et al. |
| 2019/0207518 A1 | 7/2019 | Wu et al. |

* cited by examiner

SYSTEM AND METHOD FOR ADDING PHASE TO IMPROVE LOAD TRANSIENT PERFORMANCE OF MULTI-PHASE CONVERTER

CROSS REFERENCE TO RELATED APPLICATION(S)

This application claims priority to Indian patent application Ser. No. 20/234,1025583 filed on Apr. 4, 2023 in the Indian Patent Office. The content of the above application is incorporated by reference.

BACKGROUND

The present disclosure relates to multi-phase converter.

Multi-Phase DC-DC buck converters are usually utilized to provide a regulated output voltage for one or more loads that are connected at an output of the multi-phase DC-DC buck converter. Based on the load requirement, the multi-phase DC-DC buck converter provides a load current. Accordingly, a change in the load current depends on a load ramp rate. That is to say, transient undershoot, or overshoot depends in load ramp rate.

The multi-phase DC-DC buck converter has a negative feedback loop that regulates the output voltage. In addition to the regulated output voltage, the multi-phase DC-DC buck converter provides the load current that is required by the load that is connected to the multi-phase DC-DC buck converter. FIG. 1A shows a multiphase buck converter of the related art. In the multi-phase DC-DC buck converter shown in FIG. 1A, when a requirement of the load current suddenly changes, i.e., during a fast load transient, the multi-phase DC-DC buck converter unable to support the change in the required load current to the load quickly.

The multi-phase DC-DC buck converter of the related art is provided with a capacitor at the output to supply the required load current to the load. Thus, when the charge is provided by the capacitor, the output voltage undershoot i.e. the output voltage suddenly fall down during the fast load transient. Thus, the multi-phase DC-DC buck converter unable to handle to the output voltage undershoot.

Further, usually in the multi-phase DC-DC buck converter DC Buck Converter, extra phases may be added as per the load requirement. The extra phases are further added based on, the average, peak or valley inductor current of the first (or previous already added) phase, the output voltage level of the DC-DC buck converter, and the rate of output voltage drop.

Thus, it is required that the rate of load transient be accurately estimated. However, due to sudden voltage drop the estimation of an accurate rate of load transient is difficult. Further, improper estimate of the rate of load transient can cause degraded/no change in output voltage undershoot during fast load transient events and unacceptable output voltage overshoot during mid/slow load transient events. For example, if the phases are added little late than at the time of requirement, undershoot may increase before turning ON the phase and overshoot will increase after turning ON the phases. In particular, the phase addition should occur when capacitor needs it. Otherwise, it will discharge before phase addition and will over-charge after phase addition. This causes an unacceptable output voltage overshoot during load transient.

Accordingly, there is a need to improve the output voltage undershoot of the multi-phase DC-DC buck switching converter in the event of a fast load transient without causing an unacceptable output voltage overshoot during mid/slow load transient.

SUMMARY

Embodiments of the present disclosure provide a method and system for adding phase to improve load transient performance of a multi-phase converter.

According to an aspect of an embodiment, a circuit for slew rate detection and phase control in a multi-phase converter, includes: a first comparator configured to trigger based on an output voltage of the multi-phase converter falling to a first output voltage level threshold value: a second comparator configured to trigger based on the output voltage further falling to a second output voltage level threshold value which is lower than the first output voltage level threshold value: a timer configured to start to run for a predefined time window, based on the output voltage falling below the first output voltage level threshold value; and a phase control logic configured to: distinguish a ramp rate of the output voltage as corresponding to a slow-rate ramp, a mid-rate ramp or a fast-rate ramp based on outputs of the first comparator, the second comparator, and the timer, and enable phases synchronously or asynchronously based on the distinguishing of the ramp rate of the output voltage as corresponding to the mid-rate ramp or the fast-rate ramp.

According to an aspect of an embodiment, a method for slew rate detection and phase control in a multi-phase converter, includes: triggering based on an output voltage of the multi-phase converter falling to a first output voltage level threshold value of a first comparator: starting a timer to run for a predefined time window, based on the output voltage falling below the first output voltage level threshold value; triggering based on the output voltage falling to a second output voltage level threshold value of a second comparator, is the second output voltage level threshold value being lower than the first output voltage level threshold value; distinguishing a ramp rate of the output voltage as corresponding to a slow-rate ramp, a mid-rate ramp or a fast-rate ramp based on outputs of the first comparator, the second comparator, and the timer: and enable phases synchronously or asynchronously based on the distinguishing of the ramp rate of the output voltage as corresponding to the mid-rate ramp or the fast-rate ramp.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
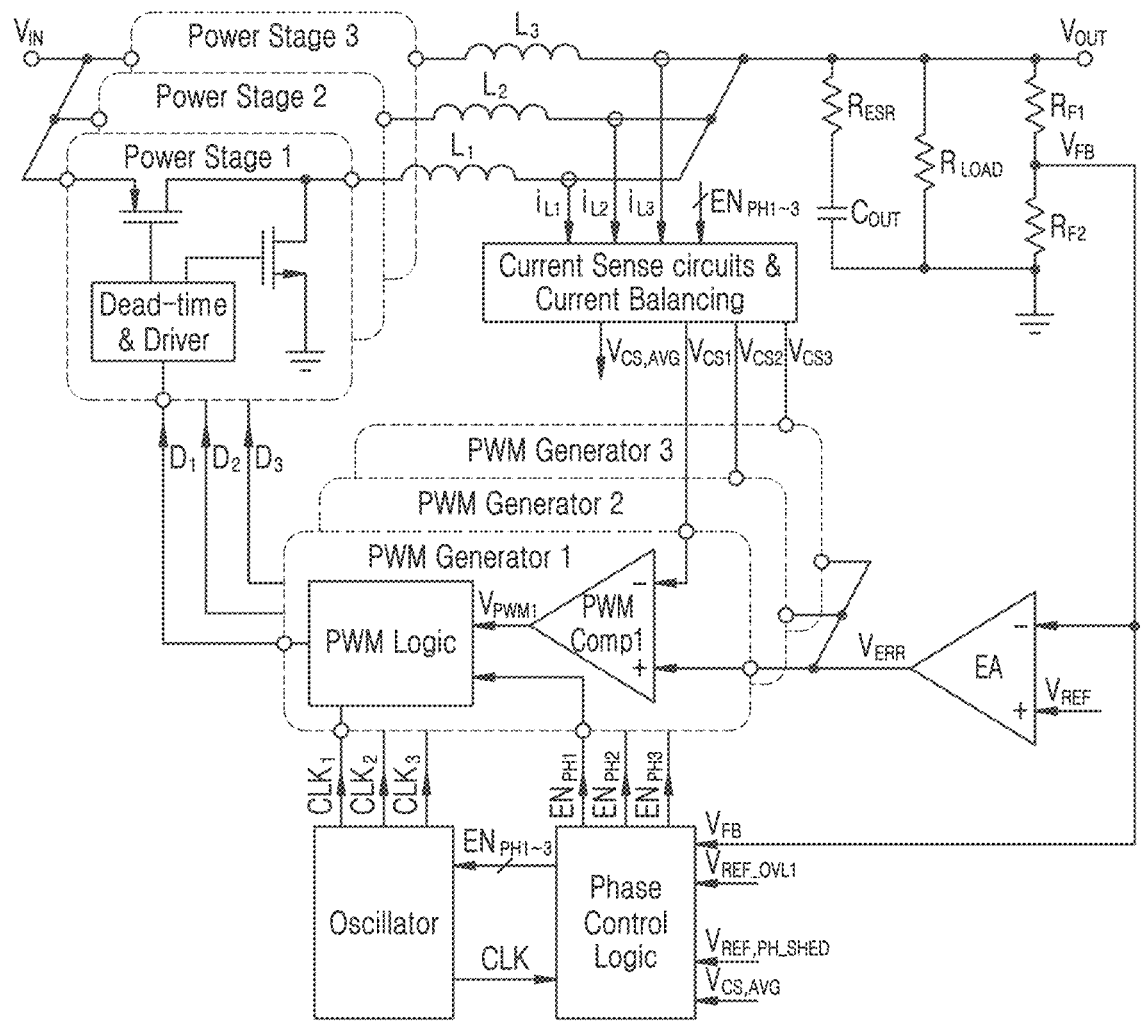
FIG. 1A illustrates a multiphase buck converter of the related art.

It should be understood at the outset that although illustrative implementations of embodiments of the present disclosure are illustrated below, embodiments may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

Further, it will be appreciated that elements in the drawings are illustrated for simplicity and may not have necessarily been drawn to scale. For example, the flow charts may illustrate the method in terms of the most prominent steps involved to help to improve understanding of embodiments. Furthermore, in terms of the construction of the device, one or more components of the device may have been represented in the drawings by conventional symbols, and the drawings may show only those specific details that are pertinent to understanding the embodiments so as not to obscure the drawings with details that will be readily apparent to those of ordinary skill in the art having the benefit of the description herein.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or one embodiment or several embodiments or all embodiments. Accordingly, the term "some embodiments" is defined as meaning "one embodiment, or more than one embodiment, or all embodiments."

The terminology and structure employed herein are for describing, teaching, and illuminating some embodiments and their specific features and elements and do not limit, restrict, or reduce the spirit and scope of the claims or their equivalents.

More specifically, any terms used herein such as but not limited to "includes," "comprises," "has," "have," and grammatical variants thereof do not specify an exact limitation or restriction and certainly do not exclude the possible addition of one or more features or elements, unless otherwise stated, and must not be taken to exclude the possible removal of one or more of the listed features and elements, unless otherwise stated.

Whether or not a certain feature or element was limited to being used only once, either way, it may still be referred to as "one or more features" or "one or more elements" or "at least one feature" or "at least one element." Furthermore, the use of the terms "one or more" or "at least one" "a plurality of" feature or element do not preclude there being none of that feature or element unless otherwise specified.

Unless otherwise defined, all terms, and especially any technical and/or scientific terms, used herein may be taken to have the same meaning as commonly understood by one having ordinary skill in the art.

Embodiments will be described below in detail with reference to the accompanying drawings.

The present disclosure discloses a slew rate detector and phase control circuitry for adding extra phases based on a condition of an output voltage (Vout) of a multi-phase converter and based on a rate of an output voltage drop. According to an embodiment, the rate of the output voltage drop is detected by the slew rate detector and phase control circuitry. This provides an appropriate estimation of a slew rate of the multi-phase converter.

According to an embodiment, a comparator is designed to trigger at two output voltage levels. The two output voltage level of the comparator are different and one is at a lower level than the other. Further, a timer with a programmable window duration is provided to distinguish a ramp rate of the output voltage (Vout) of the multi-phase converter as a slow-rate, a mid-rate or a fast-rate ramp rate. Further, a phase control logic circuit is provided that distinguishes the ramp rate. The phase control logic circuit is further enabled phases synchronously or asynchronously for its addition based on the distinguishing of the ramp rate. A detailed design and working of the slew rate detector and phase control circuitry is explained in the forthcoming paragraphs.

Figure 1B:
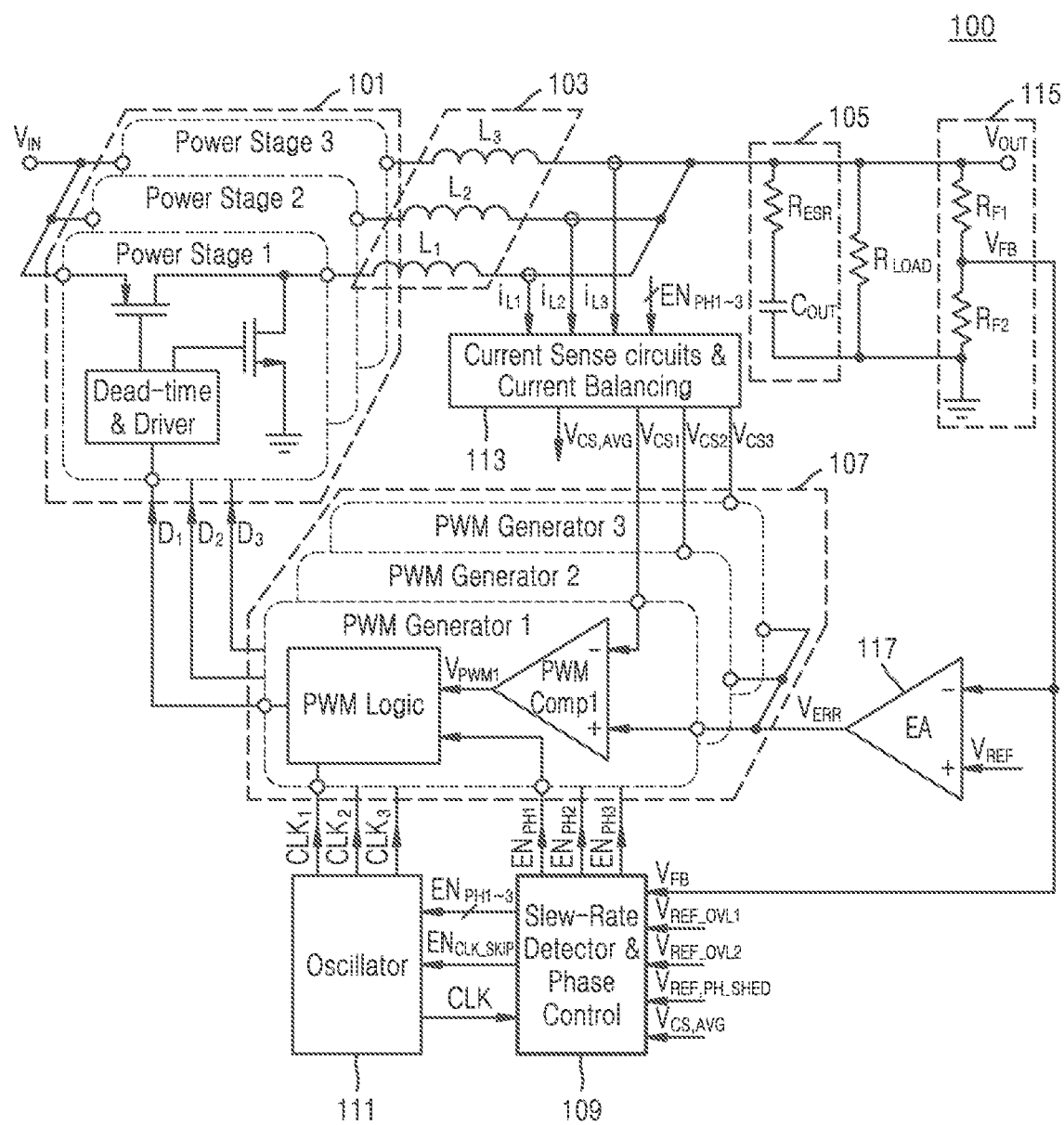
FIG. 1B illustrates a circuit diagram of a multiphase DC-DC Buck converter, according to an embodiment of the present disclosure.

FIG. 1B illustrates a circuit diagram of a multiphase DC-DC Buck converter, according to an embodiment of the present disclosure. A multiphase DC-DC Buck converter 100 is shown in the FIG. 1B. According to an embodiment, the multiphase DC-DC Buck converter 100 may be alternatively referred as a multiphase converter or buck converter throughout the disclosure without deviating from the scope of embodiments. The multiphase converter 100 includes a power stage circuit 101 that is configured to charge and discharge the inductors in an inductor circuit 103 by turning ON/OFF the PMOS and NMOS switch as per duty cycle defined by input voltage (VIN), output voltage (Vout) and a control loop (107 and 117), while ensuring the average inductor current is maintained equal to load current, defined by load resistor (RLOAD) in a circuit 115. The power stage circuit 101 includes three phases, as an example, in FIG. 1B. One or more of the phases is enabled in order to maintain Vout at a target value and supply current to the load RLOAD. Adding a phase refers to enabling one of the power stages of 101. According to an embodiment, the PWM generator circuit 107 and the OPAM 117 forms a control loop.

Power stage circuit 101 inductors are connected to a capacitor circuit 105 which provides an output voltage (Vout). According to an embodiment, the capacitor circuit 105 may be alternatively referred to as capacitor and inductors circuit 103 may be alternatively referred to as inductors.

In some embodiments, a capacitor 105 is charged when the inductor 103 current is more than load current and the capacitor 105 is discharged when the inductor 103 current is less than load current. Due to the limited bandwidth of buck converter 100, control loop may respond slowly for the sudden change of load current. Thus, the capacitor 105 discharges to fulfil the load demand while output voltage (Vout) is falling down.

Further, the output of the circuit 115 is provided as a feedback voltage to the PWM generator circuit 107 via the OPAMP 117. Further, according to an embodiment, the current in the inductors of the inductor circuit 103 are observed by a current sense circuit and a current balancing 113. According to an embodiment, the current balancing 113 is configured to ensure the load is balanced equally between all enabled phases. The output of the current sense circuits and current balancing 113 is provided to the PWM generator circuit 107. The multiphase converter 100 is further includes the slew rate detector and phase control circuitry 109 for adding extra phases based on the condition of the output voltage (Vout) of a multi-phase converter 100 and a rate of the output voltage drop. According to an embodiment the output voltage (Vout) is feedback to the slew rate detector and phase control circuitry 109 for further processing.

Figure 2:
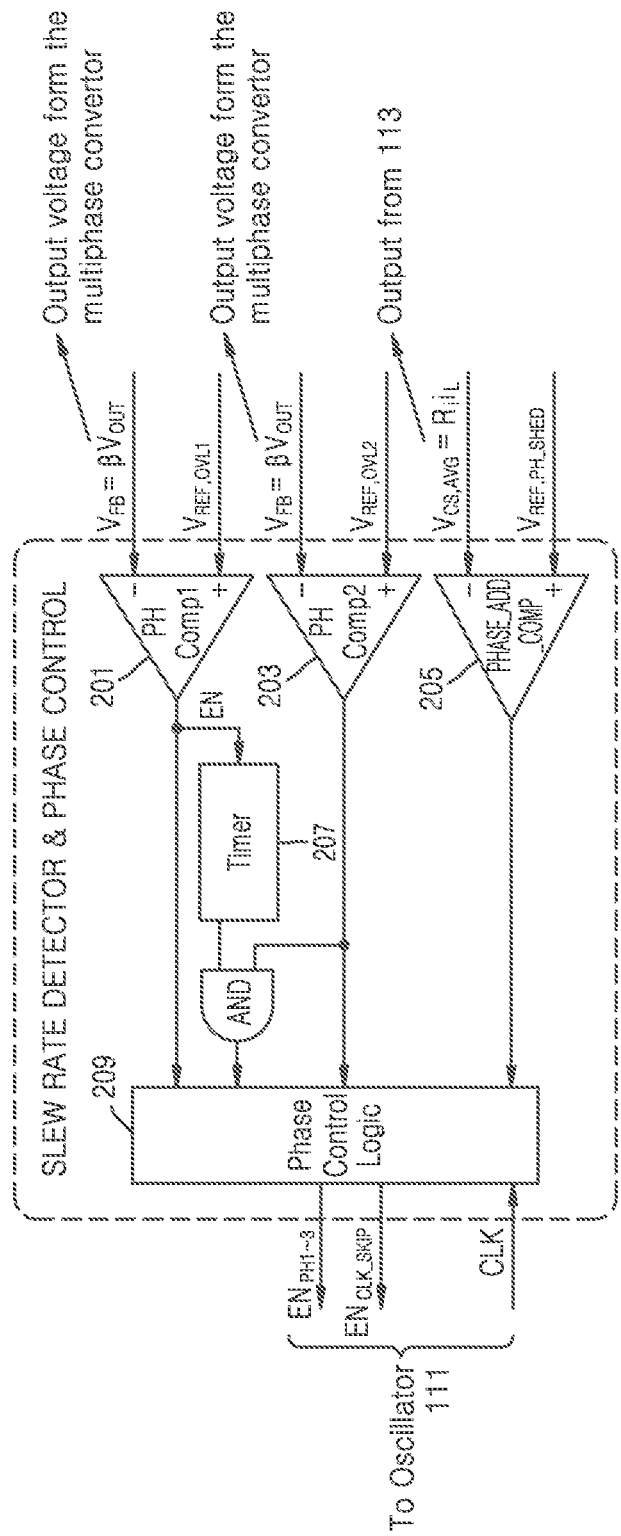
FIG. 2 illustrates a circuit diagram of the slew rate detector and phase control circuitry, according to an embodiment of the present disclosure.

FIG. 2 illustrates a circuit diagram of the slew rate detector and phase control circuitry (also referred to as a phase control circuit), according to an embodiment of the present disclosure. According to an embodiment of the present disclosure the slew rate detector and phase control circuitry 109 is a unique circuit that is specifically designed to for the slew rate detection and phase control in the multi-phase converter. According to an embodiment, the slew rate detector and phase control circuitry 109 includes a first comparator 201, a second comparator 203, a phase add comparator 205. The first comparator 201, a second comparator 203 is configured to receive the feedback voltage $V_{FB}$ from the out voltage (Vout) of the multiphase converter 100. The equation of the feedback voltage $V_{FB}$ is given by Equation (1) as follows:

$$V_{FB} = \beta * Vout, \qquad (1)$$

where β is a multiplying factor that is predefined as per the multi-phase converter 100 requirement, and "*" indicates multiplication.

According to an embodiment, the first comparator 201 and the second comparator 203 are configured to trigger at output voltage levels $V_{REF,\ OVL1}$ and $V_{REF,\ OVL2}$ respectively. The output voltage levels $V_{REF,\ OVL1}$ and $V_{REF,\ OVL2}$ are programmable threshold values of the first comparator 201 and the second comparator 203 respectively. The output voltage levels $V_{REF,\ OVL1}$ and $V_{REF,\ OVL2}$ are alternatively referred as a first output voltage level threshold value and a second output voltage level threshold value respectively throughout the disclosure without deviating from the scope of embodiments. Further, the output voltage levels $V_{REF,\ OVL1}$ and $V_{REF,\ OVL2}$ are programmed such that value of the $V_{REF,\ OVL1}$ is lower than the value of the $V_{REF,\ OVL2}$.

In an implementation, the first comparator 201 is configured to trigger when the output voltage (Vout) of the multi-phase converter 100 falls and hits (or crosses) the first output voltage level threshold value ($V_{REF,\ OVL1}$). The second comparator 203 is configured to trigger when the output voltage of (Vout) further falls and hits the second output voltage level threshold value $V_{REF,\ OVL2}$.

According to an embodiment, the phase add comparator 205 receives an output of the current sense circuit and current balancing 113, i.e. $V_{CS,\ AVG}$ as an input. The phase add comparator 205 further has another input as $V_{REF,\ PH,\ SHED}$. According to an embodiment, the phase add comparator 205 provides a signal to a phase control logic circuit 209 for adding the extra phases synchronously or asynchronously during slow load transient. In particular, the multiphase DC-DC buck converter 100 waits for the first comparator 201 to trigger during the slow load transient, where the second comparator 203 does not get triggered.

According to an embodiment, the slew rate detector and phase control circuitry 109 includes a timer 207. The timer 207 is a programmable timer that is programmed for a predefined time window for performing a start and stop operation. In an implementation the timer 207 receives an input from the output of the first comparator 201. According to an embodiment, the timer 207 is configured to start, for the predefined time window, when the output voltage of the multi-phase converter (Vout) falls below first output voltage level threshold value ($V_{REF,\ OVL1}$).

According to an embodiment, the slew rate detector and phase control circuitry 109 includes a phase control logic circuit 209. The phase control logic circuit 209 receives the output of the first comparator 201, the output of the second comparator 203, and the phase add comparator 205 as an input. In an implementation the phase control logic circuit 209 is configured to distinguish the ramp rate of the output voltage of the multi-phase converter (Vout) as a slow-rate, a mid-rate or a fast-rate based on the outputs of the first comparator 201, the second comparator 203, and the timer 207. The phase control logic circuit 209 is further configured to enable phases synchronously or asynchronously based on the distinguishing of the ramp rate of the output voltage (Vout) as the mid-rate or the fast-rate. A detailed operation flow of the slew rate detector and phase control circuitry 109 will be explained in the forthcoming paragraphs through the FIGS. 1B to 8.

Figure 3:
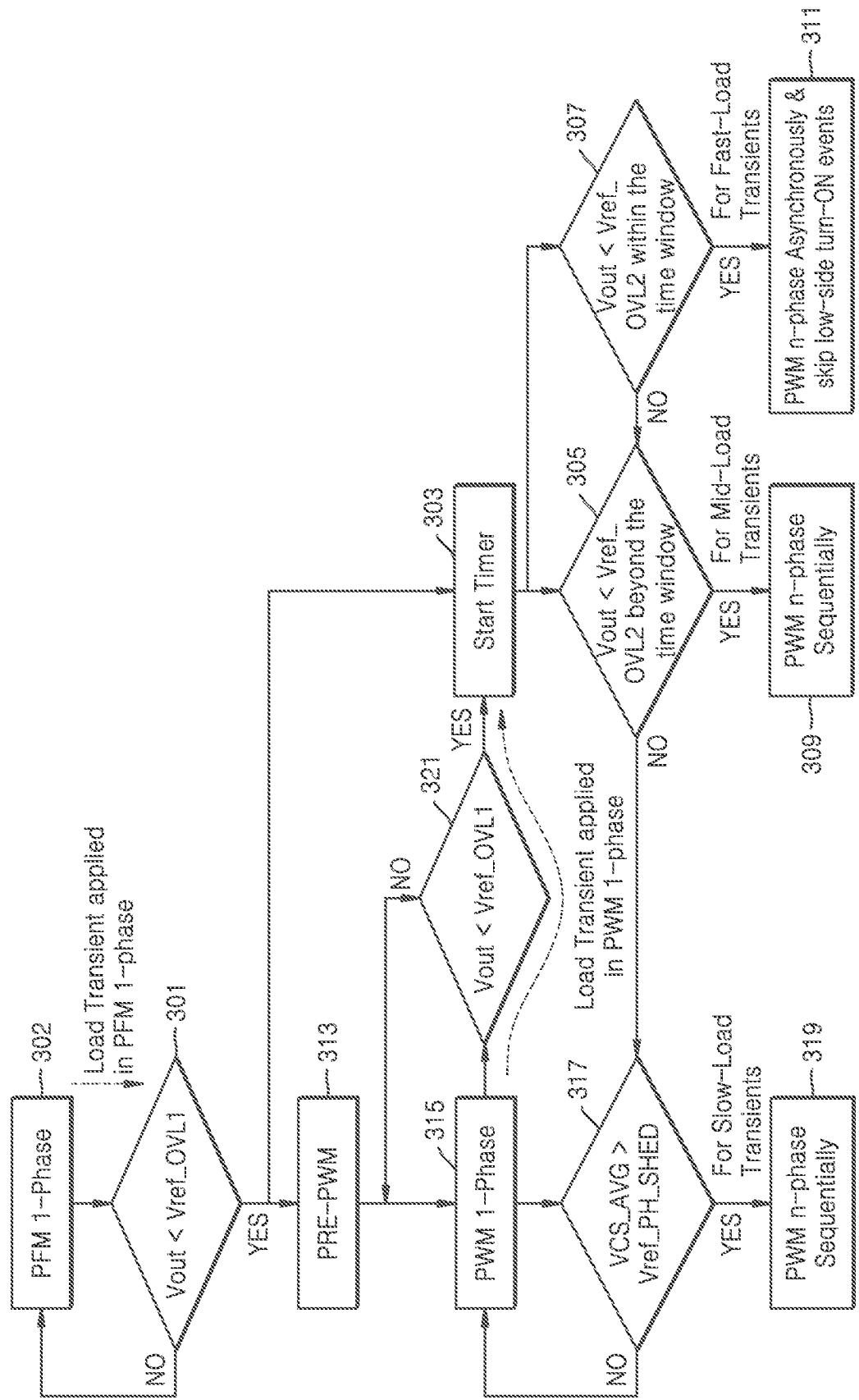
FIGS. 3 and 4 illustrates flow chart for slew rate detection and phase control in a multi-phase converter, according to an embodiment of the present disclosure.
Figure 4:
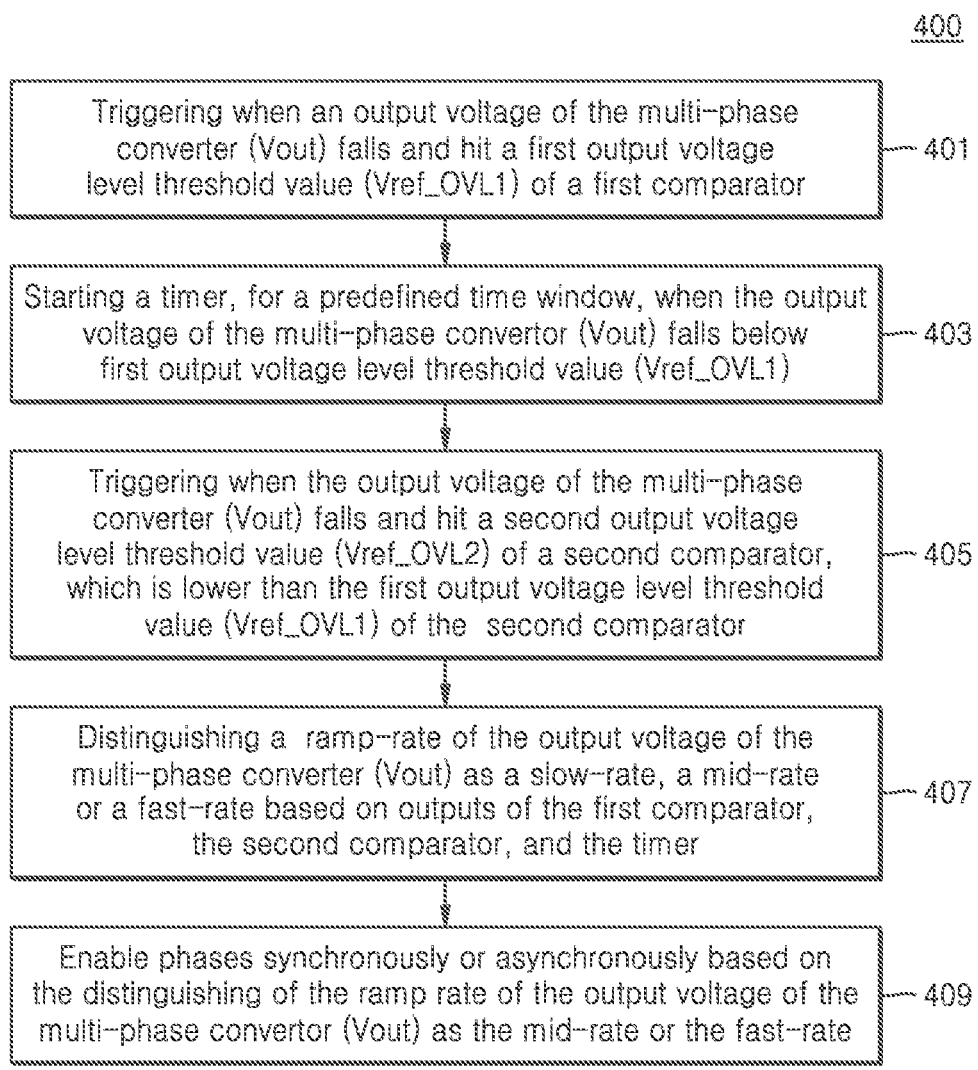

FIGS. 3 and 4 illustrate an operation flow of the slew rate detector and phase control circuitry, according to an embodiment of the present disclosure. The operation flow of the slew rate detector and phase control circuitry will be explained with the help of FIGS. 3 and 4 collaboratively. According to an embodiment, as explained above the multi converter 100 regulates the output voltage (Vout) by adding phases according to the load current. Thus, as the output voltage (Vout) is provided as a feedback to first comparator 201 and the second comparator 203 of the slew rate detector and phase control circuitry 109, so according to the fall of the output voltage (Vout) the, comparators get triggered.

Figure 5:
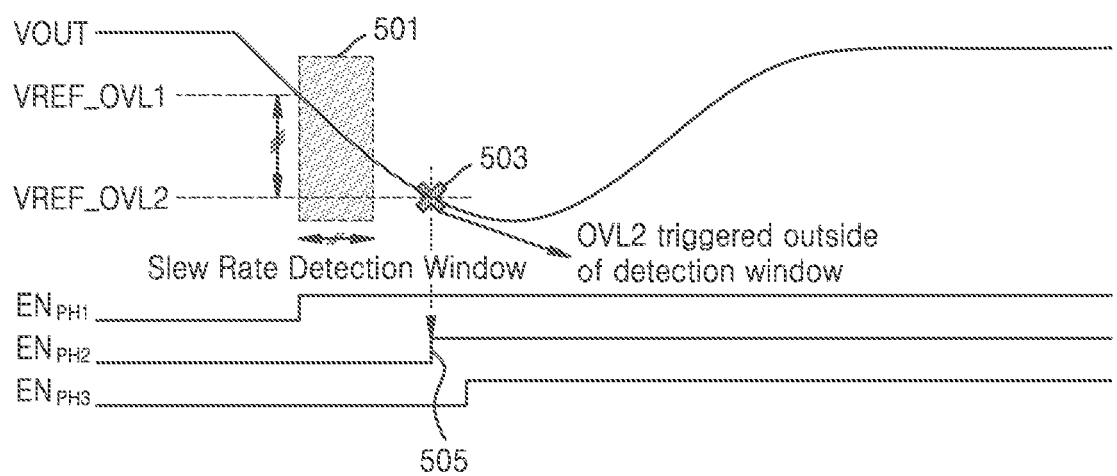
FIGS. 5, 6, and 7 illustrates mid-load transient response, fast load transient response, and a slow load transient response, of the slew rate detector and phase control circuitry respectively, according to an embodiment of the present disclosure.
Figure 6:
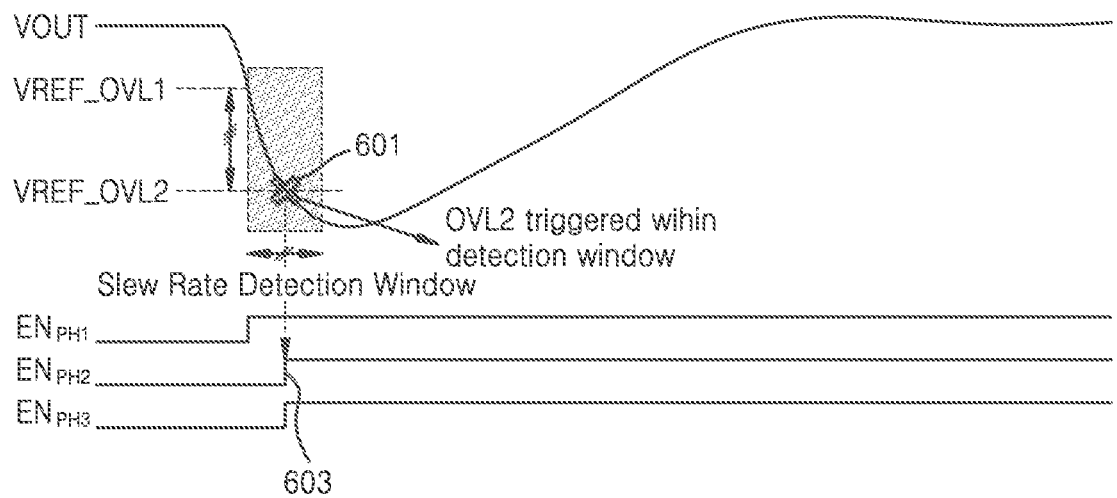

According to an embodiment, at operation 301, the slew rate detector and phase control circuitry 109 is configured to determine whether the output voltage (Vout) is less than the first output voltage level threshold value ($V_{REF,\ OVL1}$). In particular, the slew rate detector and phase control circuitry 109 is configured to determine whether the output voltage (Vout) has hits and fall below the first output voltage level threshold value ($V_{REF,\ OVL1}$). The first comparator 201 triggers at operation 401 after the determining that the output voltage (Vout) has hits and fall below the first output voltage level threshold value ($V_{REF,\ OVL1}$). FIG. 5 shows an example of the output voltage (Vout) hitting and falling below the first output voltage level threshold value ($V_{REF,\ OVL1}$). Accordingly, the first comparator 201 enables the timer 207 to start with the predefined time window 501 as shown in the FIG. 5. The predefined time window 501 may be alternatively referred as slew rate detection window 501 throughout the specification without deviating from the scope of embodiments. At operation 303, the timer 207 start, for a predefined time window, when the output voltage (Vout) of the multi-phase converter 100 falls below the first output voltage level threshold value ($V_{REF,\ OVL1}$). Operation 303 corresponds to the operation 403 of the FIG. 4. According to an embodiment, the second comparator 203 triggers at operation 405 when the output voltage (Vout) is further hits and falls below the second output voltage level threshold value ($V_{REF,\ OVL2}$). FIGS. 5 and 6 show an example of the output voltage (Vout) hitting and falling below the second output voltage level threshold value ($V_{REF,\ OVL2}$). Now, as the outputs of the first comparator 201 and the second comparator 203 are provided as an input to the phase control logic circuit 209, the phase control logic circuit 209 determine at the operation 305 and operation 307 whether the output voltage (Vout) fall is below the second output voltage level threshold value ($V_{REF,\ OVL2}$) and hits within the preconfigured time window 501 or the output voltage (Vout) fall is below the second output voltage level threshold value ($V_{REF, \, OVL2}$) and hits beyond the preconfigured time window 501 to distinguish the ramp rate of the output voltage of the multi-phase converter respectively.

Accordingly, the phase control logic circuit 209 at operation 407 distinguishes the ramp rate of the output voltage (Vout) of the multi-phase converter 100 as corresponding to a slow-rate ramp, the mid-rate ramp or the fast-rate ramp based on the outputs of the first comparator 201, the second comparator 203 and the timer 207.

Figure 7:
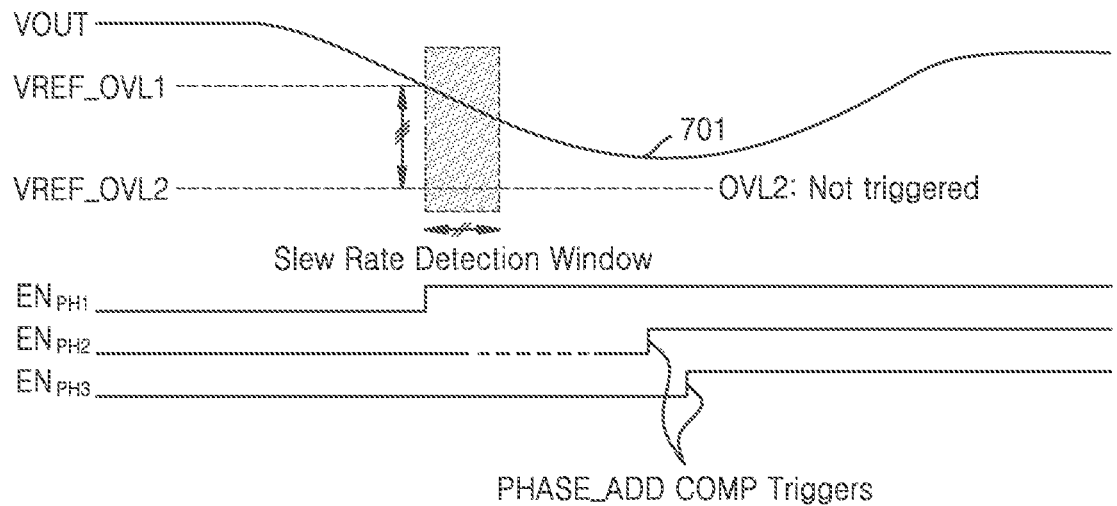

FIGS. 5, 6, and 7 illustrate a load transient response of the output voltage (Vout), according to an embodiment of the present disclosure. Referring to the FIG. 5, it can be seen that when the output voltage (Vout) has hit the second output voltage level threshold value ($V_{REF, \, OVL2}$) it is beyond the preconfigured time window 501. That is, after an expiry of the timer. In this situation, the phase control logic circuit 209 distinguishes the ramp rate of the output voltage (Vout) as a mid-rate ramp rate. Referring to the FIG. 6, when the output voltage (Vout) has hit the second output voltage level threshold value ($V_{REF, \, OVL2}$) within the preconfigured time window 501, i.e., before an expiry of the timer, the phase control logic circuit 209 distinguishes the ramp rate of the output voltage (Vout) as a high-rate ramp rate (also referred to as a fast-rate ramp). Similarly, referring to the FIG. 7, it can be seen that when the output voltage (Vout) fails to hit (see item 701 in FIG. 7) the second output voltage level threshold value ($V_{REF, \, OVL2}$), the phase control logic circuit 209 distinguishes the ramp rate of the output voltage (Vout) as a slow-rate ramp rate.

According to an embodiment, after distinguishing the ramp rate of the output voltage (Vout) of the multi-phase converter (Vout) as corresponding to the slow-rate ramp, the mid-rate ramp or the fast-rate ramp, the phase control logic circuit 209, at operation 409, is configured to enable phases synchronously or asynchronously based on the distinguishing of the ramp rate of the output voltage of the multi-phase converter (Vout) as the mid-rate or the fast-rate. The operation of enabling phases synchronously or asynchronously will be explained below.

Figure 8A:
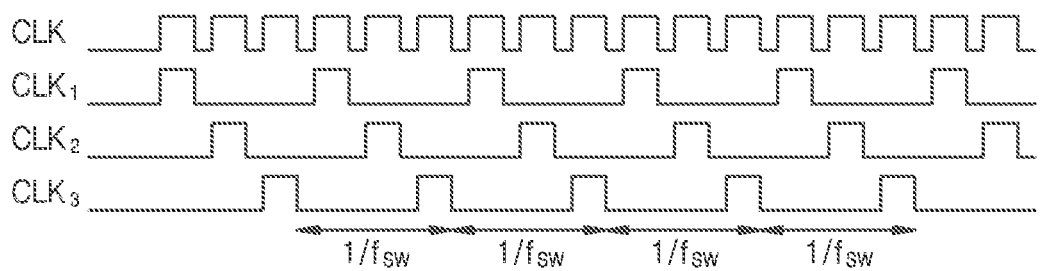
FIGS. 8A and 8B illustrate a clock skipping feature that is enabled in case on detection of a fast-load transient, according to an embodiment of the present disclosure.

According to an embodiment, the phase control logic circuit 209, at operation 309, is configured to add phases synchronously subsequent to the detection of the mid-rate ramp rate of output voltage (Vout) drop. FIG. 8 illustrates an example of adding the phases synchronously and asynchronously, according to an embodiment of the present disclosure. Further, as can be seen in the FIG. 5, item 503 indicates the output voltage (Vout) equals or crosses the second output voltage level threshold value ($V_{REF, \, OVL2}$). The phase adds comparator 205 triggers at point 505 and sends a signal to the phase logic control circuit 209 to enable the phases synchronously as shown in FIG. 8A. Accordingly, during the addition of the phases synchronously, no clock pluses are skipped.

Figure 8B:
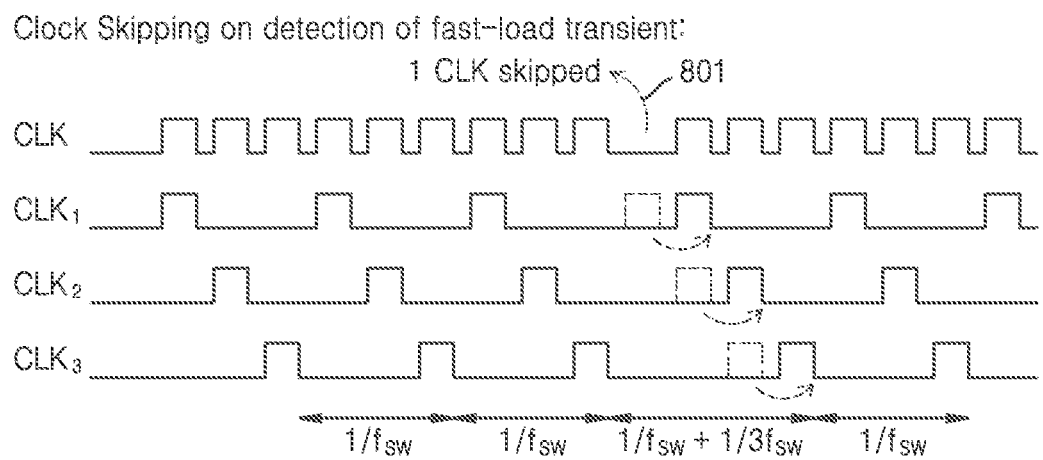

According to an embodiment, the phase control logic circuit 209, at operation 311, is configured to add phases asynchronously and by skipping at least one clock pulse subsequent to the detection of the high ramp rate of output voltage (Vout) drop. The output voltage crossing $V_{REF\_OVL2}$ is indicated by item 601 in FIG. 6. The phase adds comparator 205 triggers at point 603 and sends a signal to the phase logic control circuit 209 to enable the phases asynchronously as shown in FIG. 8B. Accordingly, during the addition of the phases asynchronously the clock pluses are skipped. See item 801 in FIG. 8B. Referring to the FIG. 8B, the phases are added immediately after the distinguishing of the high ramp rate and clock pulses are skipped. Referring to the FIG. 1, the CLK1, CLK2, and CLK3 of the oscillator 111 acts as clock signals to phases 1, 2, and 3 respectively. Thus, the skipping a clock during the load transient will increase the PMOS ON-time of all phases for once (by $T_{SW}/3$ without any change in steady-state switching frequency), allowing inductors in the inductor circuit 103 to charge (develop magnetic flux) for longer time and thereby helping in reducing the undershoot of the output voltage. The PMOS transistor is included in the oscillator 111. According to an embodiment, the "Clock-skipping" is performed when fast-load transients are detected. Further, the number of clock pulses to be skipped is programmable. Accordingly, the skipping 'n' clock pulse will increase ON time of the PMOS transistor by $n*T_{SW}/3$. The $T_{SW}$ is the PMOS transistor switching time. Further, the operations 302, 315, 321 will be explained in the forthcoming paragraphs.

For better efficiency of the multiphase DC-DC buck converter 100 across load currents, the multiphase DC-DC buck converter 100 may be operated in two modes: Pulse Width Modulation (PWM) at high loads and Pulse Frequency Modulation (PFM) at sufficiently low loads. As PFM mode of operation is used at low loads, only one-phase of multi-phase converter will be enabled. In PWM mode of operation, one or more multiple-phases can be enabled, based on the level of load current. The load transient at the output of the multiphase DC-DC buck converter 100 can happen irrespective of mode of operation, either while the multiphase DC-DC buck converter 100 is operating in PWM or PFM mode. If the load transient happens while the multiphase DC-DC buck converter 100 is operating in PFM 1-phase, at operation 302, first-comparator checks at operation 301 if the output voltage (Vout) of the multi-phase converter 100 falls below the first output voltage level threshold value ($V_{REF, \, OVL1}$), the multiphase DC-DC buck converter 100 will start the timer as mentioned in operation 303, as well enter into PWM mode of operation, at operation 315 and proceeds as mentioned earlier. The load transient can be applied, while the multiphase DC-DC buck converter 100 is operating in PWM mode as well, as in operation 315. Once the load transient is applied in PWM mode, output voltage (Vout) can fall below the first output voltage level threshold value ($V_{REF, \, OVL1}$) and may need to add phases. So, using the same first comparator 201, it is checked if output voltage (Vout) can fall below the first output voltage level threshold value ($V_{REF, \, OVL1}$) and proceeds with further checks at operations 305, 307 and 317, and phases synchronously or asynchronously. If output voltage (Vout) doesn't fall below first output voltage level threshold value ($V_{REF, \, OVL1}$), the multiphase DC-DC buck converter 100 will continue to operate in PFM 1-phase (302) or in PWM 1-phase (315). Further, the multiphase DC-DC buck converter 100 goes through a phase called PRE-PWM, at operation 313 while entering from PFM to PWM mode of operation. This PRE-PWM phase ensures that PWM control-loop is biased properly, before entering into PWM mode of operation.

According to an embodiment, the phase control logic circuit 209, at operation 319, is configured to add phases synchronously based on an average, a peak or a valley of the inductor current subsequent to the distinguishing of the output voltage as of the slow ramp rate. In an implementation, the phase adds comparator 205 receives an output of the current sense circuits and current balancing 113. Based on the received output of the current sense circuits and current balancing 113, the phase adds comparator 205 triggers, at operation 319, send signal to the phase control logic circuit 209. The output of the current sense circuits and current balancing 113 may be the average, the peak or the valley of the inductor current from the inductor circuit 103. Accordingly, the phase control logic circuit 209 add phases synchronously for the low ramp rate as explained above.

Accordingly, embodiments of the present disclosure may provide following technical effects and advantages.

Embodiments may minimize the output voltage undershoot during fast load transient events, without resulting in unacceptable output voltage overshoot during mid/slow load transient events. As the method involved in distinguishing or identify a load, particular a current demanded by a load at the output voltage, by designing the compactor for two threshold voltages and programmable on time window.

The output capacitor on board can be reduced for same output voltage transient specification The present disclosure may be extended to other Multi Phase DC-DC Buck, Boost and Buck Boost Switching Converters without limiting the scope of the disclosure to Multi Phase DC-DC Buck converters.

An impact on area and power, due to specifically designed slew rate detector and phase control circuit is minimal.

The design can easily adapt to the change in the output capacitor on board for better load transient.

Various working modifications may be made to the method without departing from the scope of embodiments.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not necessarily limited to the manner described herein.

Moreover, the actions of any flow diagram need not be implemented in the order shown: nor do all of the acts necessarily need to be performed. Also, those acts that are not dependent on other acts may be performed in parallel with the other acts.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown: nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A circuit for slew rate detection and phase control in a multi-phase converter, the circuit comprising:
    a first comparator configured to trigger based on an output voltage of the multi-phase converter falling to a first output voltage level threshold value;
    a second comparator configured to trigger based on the output voltage further falling to a second output voltage level threshold value which is lower than the first output voltage level threshold value;
    a timer configured to start to run for a predefined time window, based on the output voltage falling below the first output voltage level threshold value; and
    a phase control logic configured to:
        distinguish a ramp rate of the output voltage as corresponding to a slow-rate ramp, a mid-rate ramp or a fast-rate ramp based on outputs of the first comparator, the second comparator, and the timer, and
        enable phases synchronously or asynchronously based on the distinguishing of the ramp rate of the output voltage as corresponding to the mid-rate ramp or the fast-rate ramp.

2. The circuit of claim 1, wherein the phase control logic is further configured to distinguish the ramp rate as the fast-rate ramp, based on the output voltage falling to the second output voltage level threshold value within the predefined time window of the timer.

3. The circuit of claim 1, wherein the phase control logic is further configured to distinguish the ramp rate as corresponding to the mid-rate ramp, based on the output voltage falling to the second output voltage level threshold value after the predefined time window of the timer.

4. The circuit of claim 1, wherein the phase control logic is further configured to distinguish the ramp rate as corresponding to the slow-rate ramp based on the output voltage failing to reach the second output voltage level threshold value.

5. The circuit of claim 1, wherein the phase control logic is further configured to add the phases asynchronously and skip at least one clock pulse subsequent to the distinguishing of the ramp rate of the output voltage as corresponding to the fast-rate ramp.

6. The circuit of claim 1, wherein the phase control logic is further configured to add the phases synchronously subsequent to the distinguishing of the ramp rate of the output voltage as corresponding to the mid-rate ramp.

7. The circuit of claim 1, wherein the phase control logic is further configured to add the phases synchronously based on an average, a peak or a valley of a inductor current subsequent to the distinguishing of the ramp rate of the output voltage as corresponding to the slow-rate ramp.

8. The circuit of claim 1, wherein the predefined time window of the timer is programmable.

9. A method for slew rate detection and phase control in a multi-phase converter, the method comprising:
    triggering based on an output voltage of the multi-phase converter falling to a first output voltage level threshold value of a first comparator:
    starting a timer to run for a predefined time window, based on the output voltage falling below the first output voltage level threshold value:
    triggering based on the output voltage falling to a second output voltage level threshold value of a second comparator, is the second output voltage level threshold value being lower than the first output voltage level threshold value:

distinguishing a ramp rate of the output voltage as corresponding to a slow-rate ramp, a mid-rate ramp or a fast-rate ramp based on outputs of the first comparator, the second comparator, and the timer; and enable phases synchronously or asynchronously based on the distinguishing of the ramp rate of the output voltage as corresponding to the mid-rate ramp or the fast-rate ramp.

10. The method of claim 9, wherein the distinguishing of the ramp rate of the output voltage as corresponding to the fast-rate ramp is based on the output voltage falling to the second output voltage level threshold value within the predefined time window of the timer.

11. The method of claim 9, wherein the distinguishing of the ramp rate of the output voltage as corresponding to the mid-rate ramp, is based on the output voltage falling to the second output voltage level threshold value after the predefined time window of the timer.

12. The method of claim 9, wherein the distinguishing of the ramp rate of the output voltage as corresponding to the slow-rate ramp based on the output voltage failing to reach the second output voltage level threshold value (Vref_OVL2).

13. The method of claim 9, further comprising adding phases asynchronously and skipping at least one clock pulse subsequent to the distinguishing of the ramp rate of the output voltage as corresponding to the fast-rate ramp.

14. The method of claim 9, wherein further comprising adding phases synchronously subsequent to the distinguishing of the ramp rate of the output voltage as corresponding to the mid-rate ramp.

15. The method of claim 9, further comprising adding phases synchronously based on an average, a peak or a valley of an inductor current subsequent to the distinguishing of the ramp rate of the output voltage as corresponding to the slow-rate ramp.

16. The method of claim 9, wherein the predefined time window of the timer is programmable.

\* \* \* \* \*